US012019175B2

(12) United States Patent
Fang et al.

(10) Patent No.: US 12,019,175 B2
(45) Date of Patent: *Jun. 25, 2024

(54) GEOLOCATIONING SYSTEM AND METHOD FOR USE OF SAME

(71) Applicant: Enseo, LLC, Plano, TX (US)

(72) Inventors: William C. Fang, Plano, TX (US); Raymond S. Horton, McKinney, TX (US); Thomas R. Miller, Plano, TX (US); Vanessa Ogle, Fairview, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,007

(22) Filed: Feb. 21, 2023

(65) Prior Publication Data
US 2023/0194653 A1 Jun. 22, 2023

Related U.S. Application Data

(63) Continuation of application No. 16/661,763, filed on Oct. 23, 2019, now Pat. No. 11,585,888.

(60) Provisional application No. 62/751,072, filed on Oct. 26, 2018.

(51) Int. Cl.
*G01S 3/02* (2006.01)
*G01S 5/02* (2010.01)
*G01S 5/08* (2006.01)
*H04W 48/12* (2009.01)
*H04W 88/16* (2009.01)

(52) U.S. Cl.
CPC ............ *G01S 5/08* (2013.01); *G01S 5/02213* (2020.05); *G01S 5/0278* (2013.01); *G01S 2201/025* (2019.08); *H04W 48/12* (2013.01); *H04W 88/16* (2013.01)

(58) Field of Classification Search
CPC . G01S 5/08; G01S 5/04; G01S 5/0221; G01S 5/0278; H04W 48/12; H04W 88/16
USPC .................................................. 342/417, 451
See application file for complete search history.

(56) References Cited

U.S. PATENT DOCUMENTS

| 9,332,304 | B2 * | 5/2016 | Ogle ................ H04N 21/23605 |
| 9,344,757 | B2 | 5/2016 | Ogle et al. |
| 9,357,254 | B2 | 5/2016 | Ogle et al. |
| 9,654,826 | B2 | 5/2017 | Ogle et al. |
| 9,654,827 | B2 | 5/2017 | Ogle et al. |
| 9,712,872 | B2 | 7/2017 | Ogle et al. |
| 9,800,932 | B2 | 10/2017 | Ogle et al. |
| 9,832,490 | B2 | 11/2017 | Ogle et al. |

(Continued)

*Primary Examiner* — Chuong P Nguyen
(74) *Attorney, Agent, or Firm* — Scott Griggs; Griggs Bergen LLP

(57) ABSTRACT

A geolocationing system and method for providing awareness in a multi-space environment, such as a hospitality environment or educational environment, are presented. In one embodiment of the geolocationing system, a vertical and horizontal array of gateway devices is provided. Each gateway device includes a gateway device identification providing an accurately-known fixed location within the multi-space environment. Each gateway device includes a wireless transceiver that receives a beacon signal from a proximate wireless-enabled personal locator device. The gateway devices, in turn, send gateway signals to a server, which determines estimated location of the wireless-enabled personal location device with angle of arrival modeling.

19 Claims, 6 Drawing Sheets

(56) References Cited

U.S. PATENT DOCUMENTS

| | | | |
|---|---|---|---|
| 9,973,949 B2* | 5/2018 | Aldana | H04L 1/16 |
| 10,091,534 B2 | 10/2018 | Ogle et al. | |
| 10,104,402 B2 | 10/2018 | Ogle et al. | |
| 10,142,662 B2 | 11/2018 | Ogle et al. | |
| 10,588,107 B2* | 3/2020 | Siomina | G01S 5/06 |
| 10,827,219 B2 | 11/2020 | Miller et al. | |
| 10,827,311 B2* | 11/2020 | Fang | H04W 4/029 |
| 10,965,961 B2 | 3/2021 | Miller et al. | |
| 11,467,248 B2* | 10/2022 | Fellhauer | G01S 5/10 |
| 11,585,888 B2 | 2/2023 | Fang et al. | |
| 2011/0099575 A1 | 4/2011 | Woo et al. | |
| 2016/0007315 A1 | 1/2016 | Lundgreen et al. | |
| 2016/0334498 A1 | 11/2016 | Jamieson et al. | |
| 2018/0077459 A1 | 3/2018 | Ogle et al. | |
| 2019/0037248 A1 | 1/2019 | Ogle et al. | |
| 2019/0045229 A1 | 2/2019 | Ogle et al. | |
| 2019/0086505 A1* | 3/2019 | Malik | G01S 5/08 |
| 2019/0098340 A1 | 3/2019 | Ogle et al. | |
| 2020/0132801 A1 | 4/2020 | Fang et al. | |
| 2020/0137524 A1* | 4/2020 | Miller | H04W 4/90 |
| 2020/0309891 A1* | 10/2020 | Kauppo | G01S 3/42 |
| 2021/0011112 A1* | 1/2021 | Fang | G01S 5/0009 |
| 2021/0160546 A1* | 5/2021 | Miller | G07C 9/28 |

\* cited by examiner

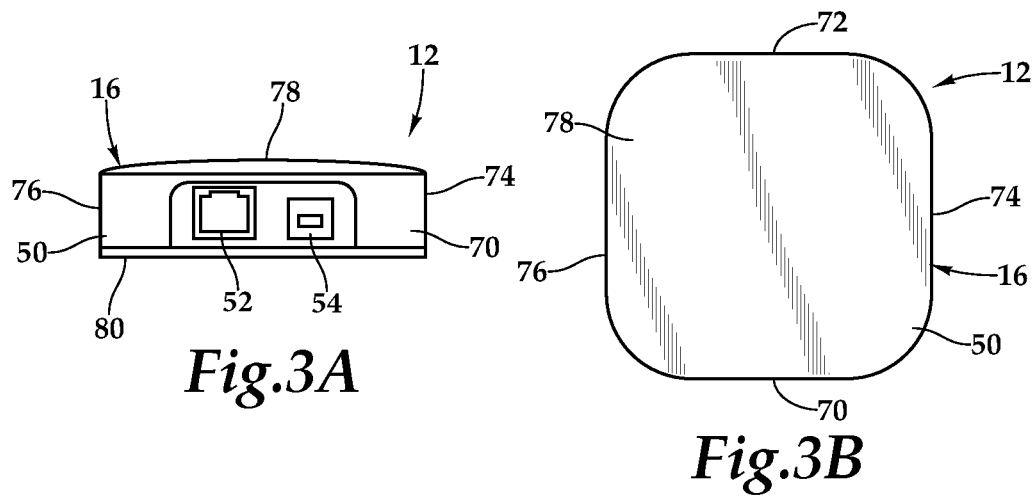
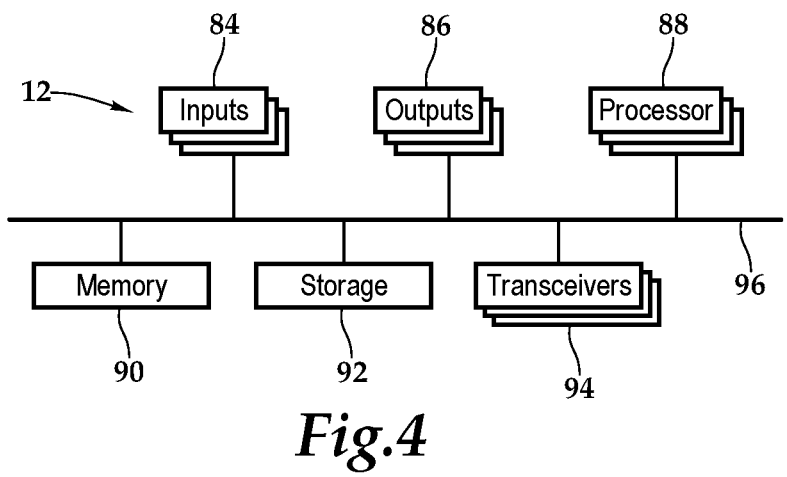
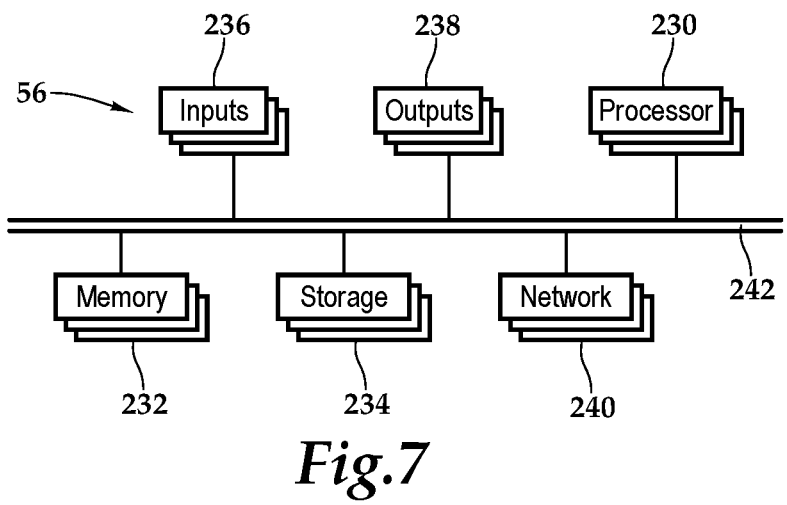

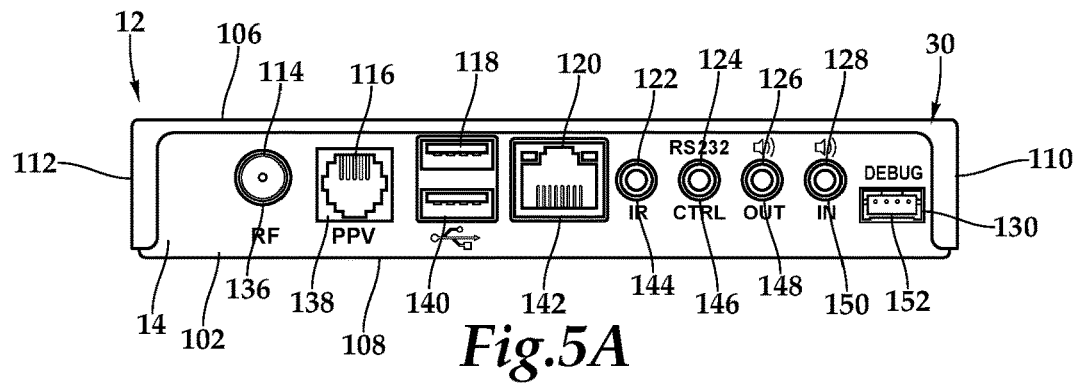

GEOLOCATIONING SYSTEM AND METHOD FOR USE OF SAME

PRIORITY STATEMENT & CROSS-REFERENCE TO RELATED APPLICATION

This application is a continuation of U.S. patent application Ser. No. 16/661,763 entitled "Geolocationing System and Method for Use of Same" filed on Oct. 23, 2019 in the names of William C. Fang, et al., Now U.S. Pat. No. 11,585,888 issued on Feb. 21, 2023; which claims priority from U.S. Patent Application Ser. No. 62/751,072 entitled "Geolocationing System and Method for Use of Same" filed on Oct. 26, 2018, in the name of William C. Fang; both of which are hereby incorporated by reference, in entirety, for all purposes.

TECHNICAL FIELD OF THE INVENTION

This invention relates, in general, to geolocationing and, in particular, to enhanced performance in systems and methods for providing awareness and safety in a multi-space or multi-room environment such as a hospitality environment, educational environment, or the like.

BACKGROUND OF THE INVENTION

Without limiting the scope of the present invention, the background will be described in relation to employee safety in hospitality environments, as an example. Employees face increased personal security risks at work in multi-room environments such as hospitality environments, which include motels, hotels, and the like, for example. Such hospitality industry employees often work alone and range over large interior areas that may be divided into many small, closed spaces. As a result of limited existing security measures, there is a need for improved systems and methods of providing awareness and safety in hospitality environments.

SUMMARY OF THE INVENTION

It would be advantageous to achieve systems and methods for providing geolocationing in a multi-space or multi-room environment such as a hospitality environment, educational environment, or the like that would improve upon existing limitations in functionality. It would be desirable to enable an electrical engineering-based and software solution that would provide enhanced awareness and safety in an easy-to-use platform in the hospitality lodging industry or in another multi-space environment. To better address one or more of these concerns, a geolocationing system and method for use of the same are disclosed.

In one embodiment of the geolocationing system, a vertical and horizontal array of gateway devices is provided. Each gateway device includes a gateway device identification providing an accurately-known fixed location within the multi-space environment. Each gateway device includes multiple wireless transceivers that receive a beacon signal from a proximate wireless-enabled personal locator device. The gateway devices, in turn, send gateway signals to a server, which determines estimated location of the proximate wireless-enabled personal location device with angle of arrival modeling. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 3A is a front elevation view of one embodiment of a gateway device depicted in FIG. 1 in further detail;

FIG. 3B is a top plan view of the gateway device depicted in FIG. 3A;

FIG. 4 is a functional block diagram depicting one embodiment of the gateway device presented in FIGS. 3A and 3B;

FIG. 5A is a wall-facing exterior elevation view of one embodiment of the set-top box depicted in FIG. 2 in further detail;

FIG. 5B is a display-facing exterior elevation view of the set-top box depicted in FIG. 2;

FIG. 5C is a front perspective view of a dongle depicted in FIG. 2 in further detail;

FIG. 6 is a functional block diagram depicting one embodiment of the set-top box presented in FIGS. 5A and 5B;

FIG. 7 is a functional block diagram depicting one embodiment of the server presented in FIG. 2;

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
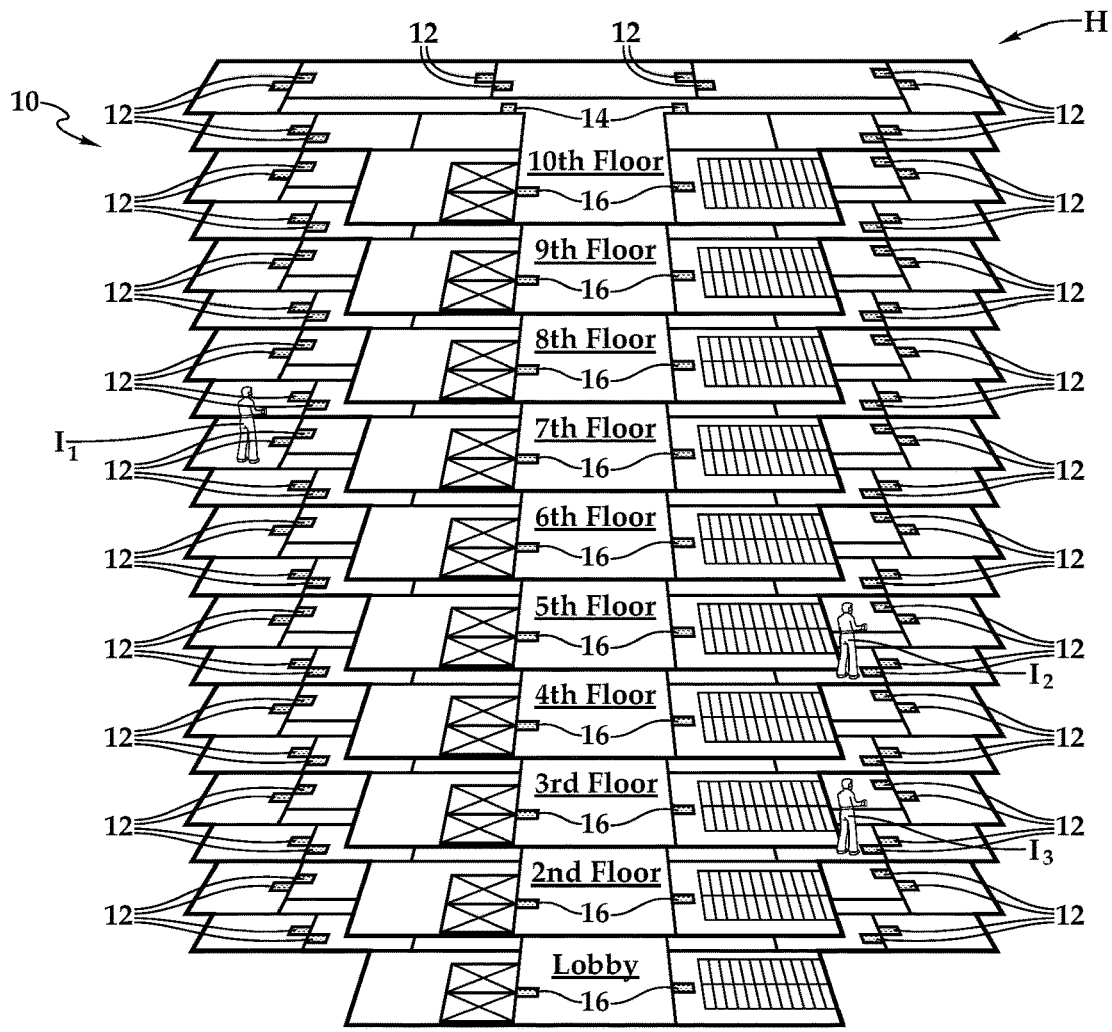
FIG. 1A is a schematic building diagram depicting one embodiment of a geolocationing system for providing awareness in a multi-space environment illustrated as a hotel, according to the teachings presented herein.
Figure 1B:
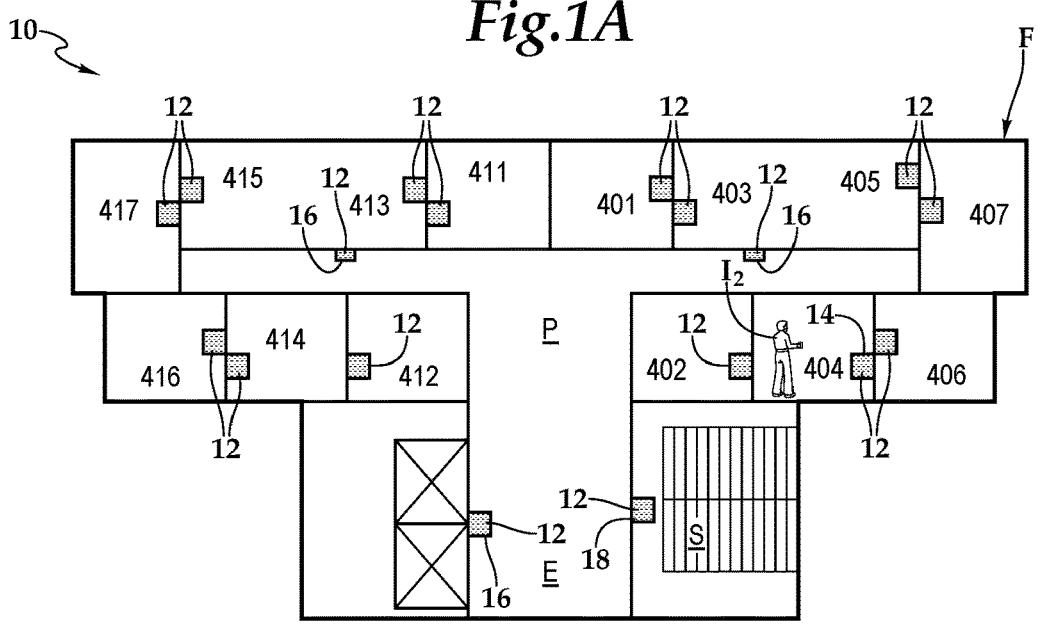
FIG. 1B is a schematic floor plan depicting a floor of the hotel presented in FIG. 1A in further detail.
Figure 2:
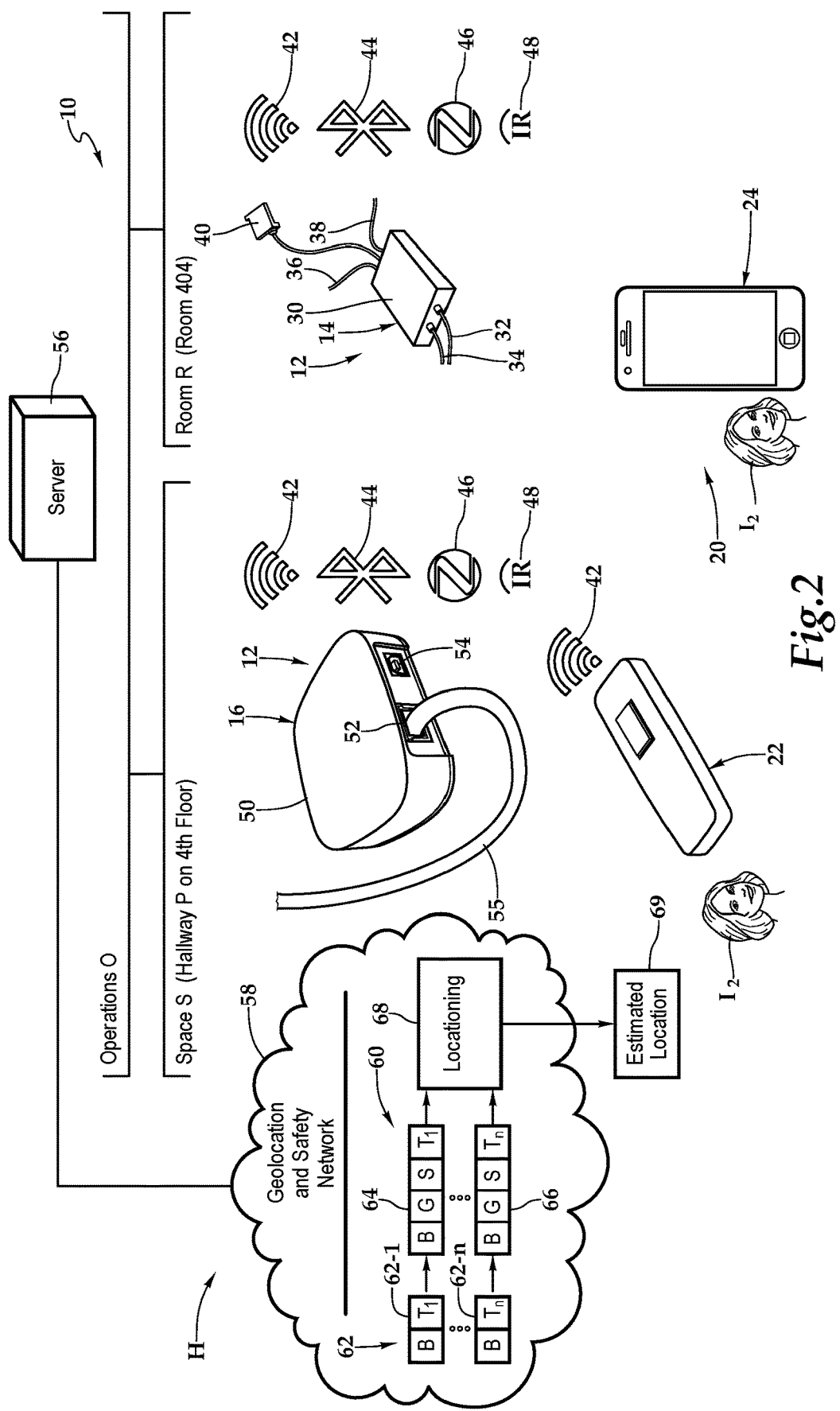
FIG. 2 is a schematic diagram depicting one embodiment of the geolocationing system presented in FIGS. 1A and 1B providing enhanced awareness and safety functionality therewith according to the teachings presented herein.

Referring initially to FIGS. 1A, 1B, and 2, therein is depicted a geolocationing system for providing awareness in a multi-space environment such as a hospitality environment, which may be as a furnished multi-family residence, dormitory, lodging establishment, hotel, hospital, which is schematically illustrated and designated 10. The multi-space environment may also be a multi-unit environment such as an educational environment like a school or college campus, for example. More generally, the geolocationing system 10 and the teachings presented herein are applicable to any multi-space environment including hospitality environments, educational campuses, hospital campuses, office buildings, multi-unit dwellings, sport facilities and shopping malls, for example.

As shown, by way of example and not by way of limitation, the multi-space environment is depicted as a hotel H having a lobby and floors F, which are appropriately labeled the $2^{nd}$ floor through the $10^{th}$ floor. Further, by way of example, the 4th floor is depicted with rooms 401, 402, 403, 404, 405, 406, 407, 411, 412, 413, 414, 415, 416, and 417. Additionally, a common area near the elevators is labeled E, a hallway labeled P, and a stairwell is labeled S. The lobby, the common area E, the hallway P, and the stairwell S are further illustrations of spaces in the multi-space environment in addition to the rooms.

Gateway devices 12 are deployed as part of a horizontal and vertical array, which is generally a spatial array, throughout the hotel H. It should be appreciated, however, that the gateway devices 12 and more generally deployment of the system 10 may include a horizontal array. Further, the deployment may be in a single story, multiple stories, or a combination thereof. As will be discussed in further detail hereinbelow, the gateway devices 12 may include set-top boxes 14, gateway service devices 16, or common space gateway devices 18.

Within the hospitality environment, individuals, such as $I_1$, $I_2$, $I_3$ carry personal locator devices 20 which periodically, or on demand, transmit beacons that are received by a gateway device 12. The personal locator devices 20 may be a single button personal locator device 22 or a proximate wireless-enabled interactive programmable device 24, such as a smart watch, a smart phone, or a tablet computer, for example. In one embodiment, the proximate wireless-enabled interactive programmable device 24 may be a wireless-enabled smart and interactive handheld device that may be supplied or carried by the user or guest. As shown, individual $I_1$ works in the hospitality industry in management and is presently working on the $6^{th}$ floor. The individual $I_1$ has a personal locator device 20. Individual $I_2$ works in the hospitality industry at hotel H and is presently working on the $4^{th}$ floor. As the individual $I_2$ is working in room R (Room 404) near a space S, which is hallway P on the $4^{th}$ floor, the personal locator device 20 is transmitting beacons that are received by gateway devices 12, such as the set-top box 14 that is located within the room 404 and the gateway service device 16 located in hallway P on the 4th floor of the hotel H. Also, individual $I_3$ is a hotel contractor walking on the $2^{nd}$ floor with, as mentioned, a personal locator device 20 also.

As shown, the gateway device 12 in the room 404 is a set-top box 14, which may be connected to an electronic visual display device such as a display or television. The set-top box 14 includes a housing 30 and a connection, which is depicted as an HDMI connection 32, connects the set-top box 14 to the display (not shown). Other connections include a power cable 34 coupling the set-top box 14 to a power source, a coaxial cable 36 coupling the set-top box 14 to an external cable source, and a category five (Cat 5) cable 38 coupling the set-top box 14 to an external pay-per-view source, for example. As shown, the set-top box 14 may include a dongle 40 providing particular technology and functionality extensions thereto. That is, the set-top box 14 may be a set-top box-dongle combination in one embodiment. More generally, it should be appreciated that the cabling connected to the set-top box 14 will depend on the environment and application, and the cabling connections presented in FIG. 2 are depicted for illustrative purposes. Further, it should be appreciated that the positioning of the set-top box 14 will vary depending on environment and application and, with certain functionality, the set-top box 14 may be placed more discretely behind the display or as an in-wall mount. At least one antenna associated with the set-top box 14 provides for the wireless capabilities of the gateway device 12 and include, for example, wireless standards: Wi-Fi 42, Bluetooth 44, ZigBee 46, infrared (IR) 48. In one embodiment, the gateway device 12 includes multiple wireless transceivers being part of a 2.4G multi-array of antennas.

As mentioned, the gateway device 12 in the hallway P of the $4^{th}$ floor is a gateway service device 16 having a housing 50 with physical connection ports 52, 54. A network cable 55, which is depicted as a category five (Cat 5) cable 38, is secured to physical connection port 52. In one embodiment, multiple antennas provide for the wireless capabilities of the gateway device 12 and include, for example, wireless standards: Wi-Fi 42, Bluetooth 44, ZigBee 46, and IR 48. In one embodiment, this gateway device 12 includes multiple wireless transceivers being part of a 2.4G multi-array of antennas. More generally, it should be appreciated that the cabling connected to the gateway device 12 and antenna configuration will depend on the environment and application and the cabling connections and wireless standards presented in FIG. 2 are depicted for illustrative purposes. Although not shown in FIG. 2, the common space gateway device 18 may be similar in appearance to the gateway service device 16.

As shown, each of the gateway devices 12, including the set-top box 14 and the gateway service device 16 of FIG. 2, have a data link, which may be a wired or wireless connection, to the server 56 which is providing a geolocation and safety network 58. Within the hospitality environment, the individuals $I_1$, $I_2$, $I_3$ carry personal locator devices 20 which periodically, or on demand, transmit beacons that are received by the geolocation and safety network 58 via one or more of the gateway devices 12. More particularly, as previously mentioned, in one implementation, an individual $I_2$ has the personal locator device 20, which may transmit a beacon from the personal locator device 20 using a wireless standard such as Wi-Fi 42 to the gateway devices 12. Each of the gateway devices 12, including the set-top box 14 and the gateway service device 16, then processes the received beacon signal and sends a gateway signal to the server 56. More particularly, with respect to data flow 60, the personal locator device 20, which is the single button personal locator 22, transmits the beacon signals 62-1 through 62-$n$, collectively beacon signals 62, which include a personal location device identification B identifying the personal locator device 20 as well as a time stamp or transmitted signal strength identification, $T_1$ through $T_n$. The beacon signal 62 is received by each of the gateway devices 12 which respectively transmit broadcast signals 64, 66 including the personal location device identification B, a gateway device identification G identifying the gateway device 12, and a signal characteristic indicator S, such as angle of arrival measurement, for example. The server 56 receives the broadcast signals 64, 66 and uses the multiple broadcast signals, including the broadcast signals 64, 66, for locationing 68, for determining the estimated location 69 of the personal locator device 20 of the individual $I_2$. The server 56, in turn, sends out the appropriate notifications to various phones, activates alarms, or notify others via a computer, depending on the situation. As a spatial array of horizontal and vertical gateway devices 12 are provided, the server 56 and geolocationing system 10 presented herein is able to determine the location of the individual associated with the personal locator device 20 within a building. The estimated location 69 includes which floor the individual is presently located as well as the room or common area or other spatial information.

Referring to FIG. 3A, FIG. 3B, and FIG. 4, the gateway device 12 may be a set-top unit that is an information appliance device that does not include television-tuner functionality and generally contains convenience and safety functionality. The gateway service device 16 includes the housing 50 having a front wall 70, rear wall 72, side wall 74, side wall 76, top wall 78, and bottom base 80. It should be appreciated that front wall, rear wall, and side wall are relative terms used for descriptive purposes and the orientation and the nomenclature of the walls may vary depending on application. The front wall 70 includes various ports, including the ports 52, 54 that provide interfaces for various interfaces, including inputs 84 and outputs 86. In one implementation, as illustrated, the port 52 is an RJ-45 port and port 54 is a USB2 port. It should be appreciated that the configuration of ports may vary with the gateway device depending on application and context.

Within the housing 50, a processor 88, memory 90, storage 92, the inputs 84, and the outputs 86 are interconnected by a bus architecture 96 within a mounting architecture. The processor 88 may process instructions for execution within the computing device, including instructions stored in the memory 90 or in storage 92. The memory 90 stores information within the computing device. In one implementation, the memory 90 is a volatile memory unit or units. In another implementation, the memory 90 is a non-volatile memory unit or units. Storage 92 provides capacity that is capable of providing mass storage for the gateway device 12. Various inputs 84 and outputs 86 provide connections to and from the computing device, wherein the inputs 84 are the signals or data received by the gateway device 12, and the outputs 86 are the signals or data sent from the gateway device 12.

Multiple transceivers 94 are associated with the gateway device 12 and communicatively disposed with the bus 96. As shown the transceivers 94 may be internal, external, or a combination thereof to the housing. Further, the transceivers 94 may be a transmitter/receiver, receiver, or an antenna for example. Communication between various amenities in the hotel room and the gateway device 12 may be enabled by a variety of wireless methodologies employed by the transceivers 94, including 802.11, 802.15, 802.15.4, 3G, 4G, Edge, Wi-Fi, ZigBee, near field communications (NFC), Bluetooth low energy and Bluetooth, for example. Also, infrared (IR) may be utilized. In one embodiment, the gateway device 12 includes multiple wireless transceivers that are part of a 2.4G multi-array of antennas for determining the angle of arrival measurement.

The memory 90 and storage 92 are accessible to the processor 88 and include processor-executable instructions that, when executed, cause the processor 88 to execute a series of operations. With respect to the processor-executable instructions, the processor 88 is caused to receive and process a beacon signal 62 including a personal location device identification B. More particularly, the processor-executable instructions cause the processor 88 to receive a beacon signal 62 via the wireless transceiver from a personal locator device 20, such as a single button personal locator 22 or a proximate wireless-enabled personal locator device 24. The processor-executable instructions then cause the processor 88 to measure incident angle of arrival of the beacon signal 62. The instructions may then cause the processor 88 to generate a gateway signal including the personal location device identification B, a gateway device identification G, and signal characteristics indicator S, including angle of arrival measurement. A time stamp may also be generated. Finally, the instructions may cause the processor 88 to send the gateway signal to the server 56. The processor 88 may use a wired or wireless connection to send the gateway signal to the server 56.

Referring to FIG. 5A, FIG. 5B, FIG. 5C, and FIG. 6, as used herein, set-top boxes, back boxes and set-top/back boxes may be discussed as set-top boxes. By way of example, the gateway device 12 as the set-top box 14 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 14 includes the housing 30 having a rear wall 102, front wall 104, top wall 106, bottom base 108, and two side walls 110, 112. It should be appreciated that front wall, rear wall, and side wall are relative terms used for descriptive purposes and the orientation and the nomenclature of the walls may vary depending on application. The front wall includes various ports, ports 114, 116, 118, 120, 122, 124, 126, 128 and 130 that provide interfaces for various interfaces, including inputs 132 and outputs 134. In one implementation, as illustrated, the ports 114 through 130 include inputs 132 and outputs 134 and, more particularly, an RF input 136, a RJ-45 input 138, universal serial bus (USB) input/outputs 140, an Ethernet category 5 (Cat 5) coupling 142, an internal reset 144, an RS232 control 146, an audio out 148, an audio in 150, and a debug/maintenance port 152. The front wall 104 also includes various inputs 132 and outputs 134. More particularly, ports 160, 162, 164, 166, 168 include a 5V dc power connection 170, USB inputs/outputs 172, an RJ-45 coupling 174, an HDMI port 176 and an HDMI port 178. It should be appreciated that the configuration of ports may vary with the set-top box depending on application and context. As previously alluded to, the housing 30 may include a housing-dongle combination including, with respect to the dongle 40, a unit 180 having a cable 182 with a set-top box connector 184 for selectively coupling with the set-top box 12.

Within the housing 30, a processor 200, memory 202, storage 204, the inputs 132, and the outputs 134 are interconnected by a bus architecture 206 within a mounting architecture. It should be understood that the processor 200, the memory 202, the storage 204, the inputs 132, and the outputs 134 may be entirely contained within the housing 30 or the housing-dongle combination. The processor 200 may process instructions for execution within the computing device, including instructions stored in the memory 202 or in storage 204. The memory 202 stores information within the computing device. In one implementation, the memory 202 is a volatile memory unit or units. In another implementation, the memory 202 is a non-volatile memory unit or units. Storage 204 provides capacity that is capable of providing mass storage for the set-top box 14. Various inputs 132 and outputs 134 provide connections to and from the computing device, wherein the inputs 132 are the signals or data received by the set-top box 14, and the outputs 134 are the signals or data sent from the set-top box 14. A television content signal input 208 and a television output 210 are also secured in the housing 30 in order to receive content from a source and forward the content, including external content such as cable and satellite and pay-per-view (PPV) programing, to the display.

A transceiver 212 is associated with the set-top box 14 and communicatively disposed with the bus 206. As shown the transceiver 212 may be internal, external, or a combination thereof to the housing 30. Further, the transceiver 212 may be a transmitter/receiver, receiver, or an antenna for example. Communication between various devices and the set-top box 14 may be enabled by a variety of wireless methodologies employed by the transceiver 212, including 802.11, 3G, 4G, Edge, Wi-Fi, ZigBee, near field communications (NFC), Bluetooth low energy and Bluetooth, for example. Also, infrared (IR) may be utilized.

One or more wireless communication antennas 214 are associated with the set-top box 12 and communicatively disposed with the bus 206. As shown the wireless communication antennas 214 may be internal, external, or a combination thereof to the housing 30. Further, the wireless communication antenna 214 may be a transmitter/receiver, receiver, or an antenna for example. Communication from the set-top box 14 to one or more of the proximate wireless-enabled programmable interactive devices 24 may be enabled by a variety of wireless methodologies employed by the wireless communication antennas 214, including 802.11, 3G, 4G, Edge, WiFi, ZigBee, near field communications (NFC), Bluetooth low energy and Bluetooth, for example. Also, infrared (IR) may be utilized. In one implementation, the one or more wireless communication antennas 214 utilize a network connection protocol such as Bluetooth and the one or more wireless communication antennas 214 are Bluetooth transmitters. In one embodiment, the gateway device 12 includes multiple wireless transceivers that are part of a 2.4G multi-array of antennas.

The memory 202 and storage 204 are accessible to the processor 200 and include processor-executable instructions that, when executed, cause the processor 200 to execute a series of operations. With respect to the processor-executable instructions, the processor 200 is caused to receive and process a beacon signal 62 including a personal location device identification B. More particularly, the processor-executable instructions cause the processor 200 to receive a beacon signal 62 via the wireless transceiver from a proximate wireless-enabled personal locator device 20. The processor-executable instructions then cause the processor 200 to measure angle of arrival of the beacon signal 62. The instructions may then cause the processor 200 to generate a gateway signal including the personal location device identification B, a gateway device identification G, and signal characteristics indicator S, including angle of arrival measurement. Finally, the instructions may cause the processor 200 to send the gateway signal to the server 56 via a wired or wireless connection. In brief, in one embodiment, using the angle or arrival and departure technique, the gateway device 12, such as the set-top box 14 or gateway device 12, or gateway service device 16, includes a multi-array of antennas, such as 2.4G antennas, to measure the phase angle differences between received beacon signals 62 from different antennas and then calculate the angle of arrival and the angle of departure based on these measured phase differences of the beacon signals.

Referring now to FIG. 7, one embodiment of the server 56 as a computing device includes a processor 230, memory 232, storage 234, inputs 236, outputs 238, and a network adaptor 240 interconnected with various buses 242 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 230 may process instructions for execution within the server 56, including instructions stored in the memory 232 or in storage 234. The memory 232 stores information within the computing device. In one implementation, the memory 232 is a volatile memory unit or units. In another implementation, the memory 232 is a non-volatile memory unit or units. Storage 234 includes capacity that is capable of providing mass storage for the server 56. Various inputs 236 and outputs 238 provide connections to and from the server 56, wherein the inputs 236 are the signals or data received by the server 56, and the outputs 238 are the signals or data sent from the server 56. The network adaptor 240 couples the server 56 to a network such that the server 56 may be part of a network of computers, a local area network (LAN), a wide area network (WAN), an intranet, a network of networks, or the Internet, for example.

The memory 232 and storage 234 are accessible to the processor 230 and include processor-executable instructions that, when executed, cause the processor 230 to execute a series of operations. In one embodiment of first processor-executable instructions, the processor-executable instructions cause the processor to receive multiple gateway signals from multiple gateway devices of the vertical and horizontal array. The processor 230 is caused to process the gateway signals with angle of arrival modeling and determine an estimated location of the proximate wireless-enabled personal location device.

In a second embodiment of processor-executable instructions, the processor-executable instructions cause the processor 230 to receive gateway signals from respective gateway devices of the vertical and horizontal array. The processor executable instructions then cause the processor 230 to process the gateway signals with trilateration by utilizing at least three angle of arrival measurements between at least three gateway signals from respective gateway devices to determine a point of intersection therebetween. The process-executable instructions cause the processor 230 to determine the estimated location of the proximate wireless-enabled personal location device.

Figure 8:
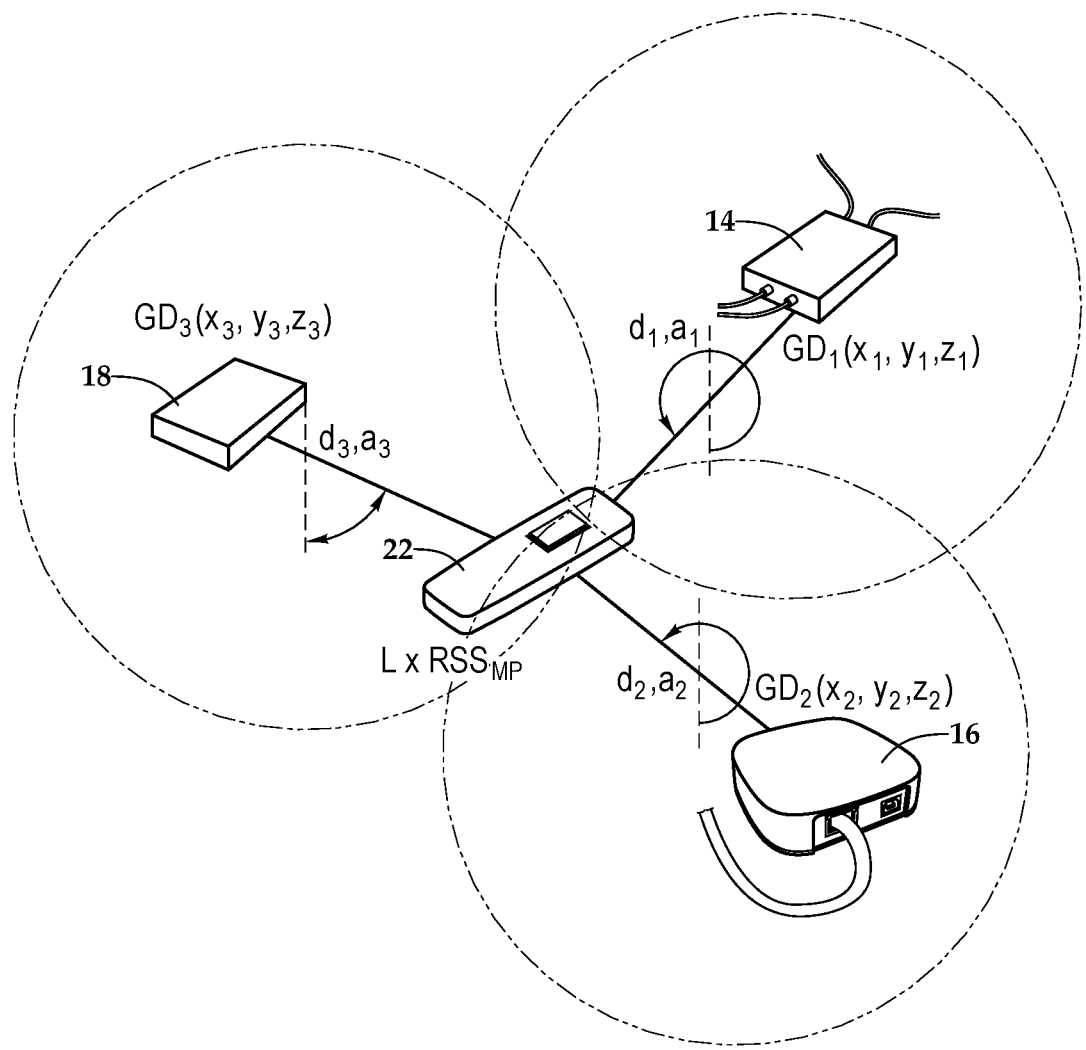
FIG. 8 is a schematic diagram depicting one embodiment of the geolocationing system presented herein.
Figure 9:
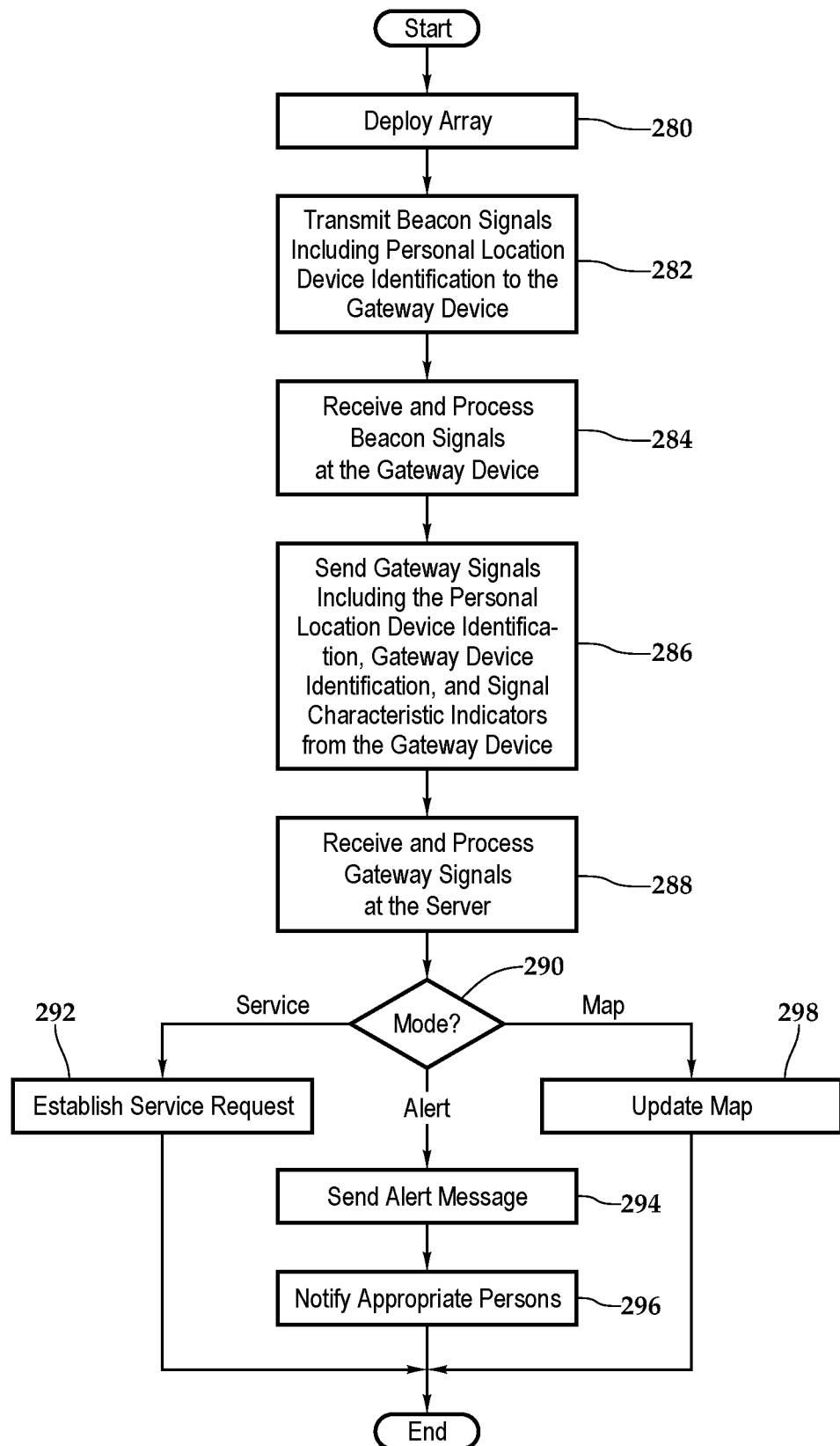
FIG. 9 is a flow chart depicting one embodiment of a method for providing a gateway device furnishing enhanced safety according to the teachings presented herein.

Referring now to FIG. 8, multiple gateway signals, such as $RSS_1$ received at the gateway device $GD_1$, $RSS_2$ received at the gateway device $GD_2$, and $RSS_3$ received at the gateway device $GD_3$, are processed with angle of arrival measurements by utilizing at least three angles (e.g., $a_1$, $a_2$, $a_3$) to determine the distance (e.g., $d_1$, $d_2$, $d_3$) between at least three gateway signals from respective gateway devices [$GD_1$ at accurately known fixed location ($x_1$, $y_1$ and $z_1$); $GD_2$ at accurately known fixed location ($x_2$, $y_2$, $z_2$); $GD_3$ at accurately known fixed location ($x_3$, $y_3$, $z_3$)] and a point of intersection therebetween, which is the estimated location L based on the angle of arrival modeling a. The gateway signals $RSS_1$, $RSS_2$, and $RSS_3$, for example, are processed in this embodiment, using the angle or arrival and departure technique, the guest device 12, such as the set-top box 14 or gateway device 16, or gateway service device 18, includes a multi-array of antennas, to measure the phase angle differences between received beacon signals from different antennas and then calculate the angle of arrival and the angle of departure ($a_1$, $a_2$, $a_3$) based on these measured phase differences of the beacon signals. This allows the location L to be determined.

FIG. 10 depicts one embodiment of a method for providing safety in a hospitality environment or other environment, according to the teachings presented herein. At block 280, the array of gateway devices is deployed vertically and horizontally throughout the hospitality environment. It should be appreciated that, as previously discussed, the methodology may be practiced with a horizontally deployed array of gateway devices as well. At block 282, beacon signals are periodically transmitted from personal location devices and received by the gateway devices.

At block 284, the beacon signals are received and processed at the gateway device. The beacon signals may include a personal location device identification corresponding to the device being employed by the user. In one embodiment, angle of arrival between the beacon transmission of the personal location devices and set-top boxes or other gateway devices is measured. At block 286, gateway signals are sent from the gateway devices to a server that is part of the geolocation and safety network. The gateway signals may include the personal location device identification, and signal characteristic indicators. At block 288, the server receives and processes the gateway signals. At decision block 290, the server takes action based on the mode of operation. In a first mode of operation at block 292, a service request is associated with the location of the user utilizing the location of the personal location device such as the proximate wireless-enabled interactive programmable device as a proxy. In a second mode of operation at block 294, an emergency alert is sent and subsequent notification (block 296) occurs. The emergency alert includes an indication of distress and the location of the user utilizing the location of the wireless-enabled interactive programmable device as a proxy. In a third mode of operation at block 298, the map of individuals is updated with the location of the user with, if privacy settings being enabled, the system maintains the privacy of the individual working in the hospitality environment such that the system only retains in memory the last known position and time of the user-supplied wireless-enabled smart and interactive handheld device. Further, in this mode of operation, the system does not reveal the location of the individual and programmable device unless and until an alert is issued.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for providing awareness in a multi-space environment, the system comprising:
    an array of gateway devices, each gateway device being positioned within a space in the multi-space environment, each gateway device having a gateway device identification providing an accurately-known fixed location;
    each gateway device of the array including:
        a housing,
        a plurality of wireless transceivers associated with the housing,
        a processor located within the housing and coupled to the plurality of wireless transceivers,
        a memory accessible to the processor, the memory including processor-executable instructions that, when executed, cause the processor to:
            receive a beacon signal via the wireless transceiver from a proximate wireless-enabled personal locator device, the beacon signal including a personal locator device identification,
            measure received incident of arrival of the beacon signal and a respective incident angle of departure of the beacon signal,
            transmit a gateway signal to a server, the gateway signal including the personal locator device identification, the gateway device identification, and angle of arrival measurement; and
    the server located within the multi-space environment and in communication with the array of gateway devices, the server receiving a plurality of gateway signals and utilizing angle of arrival modeling to determine estimated location of the proximate wireless-enabled personal location device.

2. The system as recited in claim 1, wherein the wireless transceiver is configured to communicate with a standard selected from the group consisting of infrared (IR), 802.11, 3G, 4G, Edge, Wi-Fi, ZigBee, near field communications (NFC), Bluetooth and Bluetooth low energy.

3. The system as recited in claim 1, wherein the gateway device further comprises a plurality of 2.4G wireless transceivers.

4. The system as recited in claim 1, wherein the gateway device further comprises a set-top box.

5. The system as recited in claim 1, wherein the gateway device further comprises a common space gateway device.

6. The system as recited in claim 1, wherein the gateway device further comprises a gateway service device.

7. The system as recited in claim 1, wherein the proximate wireless-enabled personal locator device further comprises a single button personal locator device.

8. The system as recited in claim 1, wherein the proximate wireless-enabled personal locator device further comprises a proximate wireless-enabled interactive programmable device.

9. The system as recited in claim 8, wherein the proximate wireless-enabled interactive programmable device further comprises a smart watch.

10. The system as recited in claim 8, wherein the proximate wireless-enabled interactive programmable device further comprises a smartphone.

11. The system as recited in claim 8, wherein the proximate wireless-enabled interactive programmable device further comprises a tablet computer.

12. The system as recited in claim 1, wherein the server further comprises a hotel server.

13. The system as recited in claim 1, wherein the server further comprises a back-office hotel server in communication with the array of set-top boxes.

14. The system as recited claim 1, wherein the system further comprises an operational mode selected from the group consisting of alerts-enabled, service request-enabled, tracking-enabled, and non-tracking-enabled.

15. The system as recited in claim 14, wherein in the alerts-enabled mode, the server receives a distress signal from the proximate wireless-enabled personal locator device.

16. The system as recited in claim 14, wherein in the service-request-enabled mode, the server receives a service request from the proximate wireless-enabled personal locator device.

17. The system as recited in claim 14, wherein in the tracking-enabled mode, the server maintains in memory a plurality of estimated locations with timestamps associated with the proximate wireless-enabled personal locator device.

18. The system as recited in claim 14, wherein in the non-tracking-enabled mode, the server maintains in memory only the last known locations with timestamps associated with the proximate wireless-enabled personal locator device.

19. A system for providing awareness in a multi-space environment, the system comprising:
- an array of gateway devices, each gateway device being positioned within a space in the multi-space environment, each gateway device having a gateway device identification providing an accurately-known fixed location;
- each gateway device of the array including:
  - a housing,
  - a plurality of wireless transceivers associated with the housing, each of the plurality of wireless transceivers being part of a 2.4G multi-array of antennas,
  - a processor located within the housing and coupled to the plurality of wireless transceivers,
  - a memory accessible to the processor, the memory including processor-executable instructions that, when executed, cause the processor to:
    - receive a beacon signal via the plurality of wireless transceivers from a proximate wireless-enabled personal locator device, the beacon signal including a personal locator device identification,
    - measure phase differences between received incident of arrival of the beacon signal and a respective incident angle of departure of the beacon signal,
    - transmit a gateway signal to a server, the gateway signal including the personal locator device identification, the gateway device identification, and angle of arrival measurement; and
- the server located within the multi-space environment and in communication with the array of gateway devices, the server receiving a plurality of gateway signals and measuring phase differences of the incident angles of arrival of each beacon signal and a respective incident angle of departure to determine estimated location of the proximate wireless-enabled personal location device.

* * * * *